(12) United States Patent
Rabinovitch et al.

(10) Patent No.: US 10,636,279 B2
(45) Date of Patent: Apr. 28, 2020

(54) REMOTE-CONTROL SECURITY MONITORING SYSTEM AND METHOD

(71) Applicant: Tyco Fire & Security GmbH, Neuhausen am Rheinfall (CH)

(72) Inventors: Yoni Rabinovitch, Talmon (IL); Barak Noy, Ramat Hasharon (IL); Guy Etgar, Tel Aviv (IL); Mota Zussman, Tel Aviv (IL); Daniel Aron Rettig, Kfar Saba (IL)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

(21) Appl. No.: 15/129,719

(22) PCT Filed: Nov. 18, 2015

(86) PCT No.: PCT/IL2015/051110
§ 371 (c)(1),
(2) Date: Sep. 27, 2016

(87) PCT Pub. No.: WO2016/098097
PCT Pub. Date: Jun. 23, 2016

(65) Prior Publication Data
US 2017/0278380 A1 Sep. 28, 2017

Related U.S. Application Data

(60) Provisional application No. 62/093,694, filed on Dec. 18, 2014.

(51) Int. Cl.
| G08B 25/10 | (2006.01) |
| H04L 12/28 | (2006.01) |
| G08B 25/00 | (2006.01) |
| G08B 29/02 | (2006.01) |

(52) U.S. Cl.
CPC .......... G08B 25/10 (2013.01); G08B 25/008 (2013.01); G08B 25/009 (2013.01); G08B 29/02 (2013.01);
(Continued)

(58) Field of Classification Search
CPC .... G08B 25/10; G08B 25/003; G08B 25/008; G08B 25/009; G08B 29/02; H04L 12/2825; H04L 12/2816–2818
See application file for complete search history.

(56) References Cited

U.S. PATENT DOCUMENTS

2006/0230270 A1  10/2006  Goffin
2007/0268121 A1*  11/2007  Vasefi ................... G06Q 10/06
                                                        340/506

(Continued)

OTHER PUBLICATIONS

International Search Report and Written Opinion, dated Feb. 22, 2016, from International Application No. PCT/IL2015/051110, filed Nov. 18, 2015. Twelve pages.

(Continued)

Primary Examiner — Eric Myers
(74) Attorney, Agent, or Firm — Arent Fox, LLP

(57) ABSTRACT

A remote-control security monitoring system (100), including an access permissions receiver (120) operable for receiving, from a first entity having first access permissions to the premises automation system (102), second access permissions to the premises automation system, a premises monitoring selector (125) operable for receiving, from the first entity, a selection of a second entity which provides remote monitoring services, a premises monitoring remote-control provider (140) operable, responsive to the selection of the second entity, for subscribing the first entity to receive remote monitoring services of the premises from the second entity, and a premises monitoring activator (145) operable, responsive to subscribing the first entity to receive the (Continued)

remote monitoring services from the second entity and responsive to receiving an instruction from the first entity, for instructing the second entity to monitor the premises on behalf of the first entity.

20 Claims, 2 Drawing Sheets

(52) U.S. Cl.
CPC ...... *H04L 12/2818* (2013.01); *H04L 12/2825* (2013.01)

(56) References Cited

U.S. PATENT DOCUMENTS

| | | |
|---|---|---|
| 2011/0074570 A1 | 3/2011 | Feldstein et al. |
| 2011/0317622 A1 | 12/2011 | Arsenault |
| 2013/0215903 A1 | 8/2013 | Kotlicki et al. |
| 2015/0309484 A1* | 10/2015 | Lyman ............... G05B 13/0205 700/275 |
| 2015/0339911 A1* | 11/2015 | Coyne .................... G08B 23/00 340/517 |

OTHER PUBLICATIONS

International Search Report and Written Opinion of the International Searching Authority, dated Jun. 29, 2017, from International Application No. PCT/IL2015/051110, filed on Nov. 18, 2015. 8 pages.

\* cited by examiner

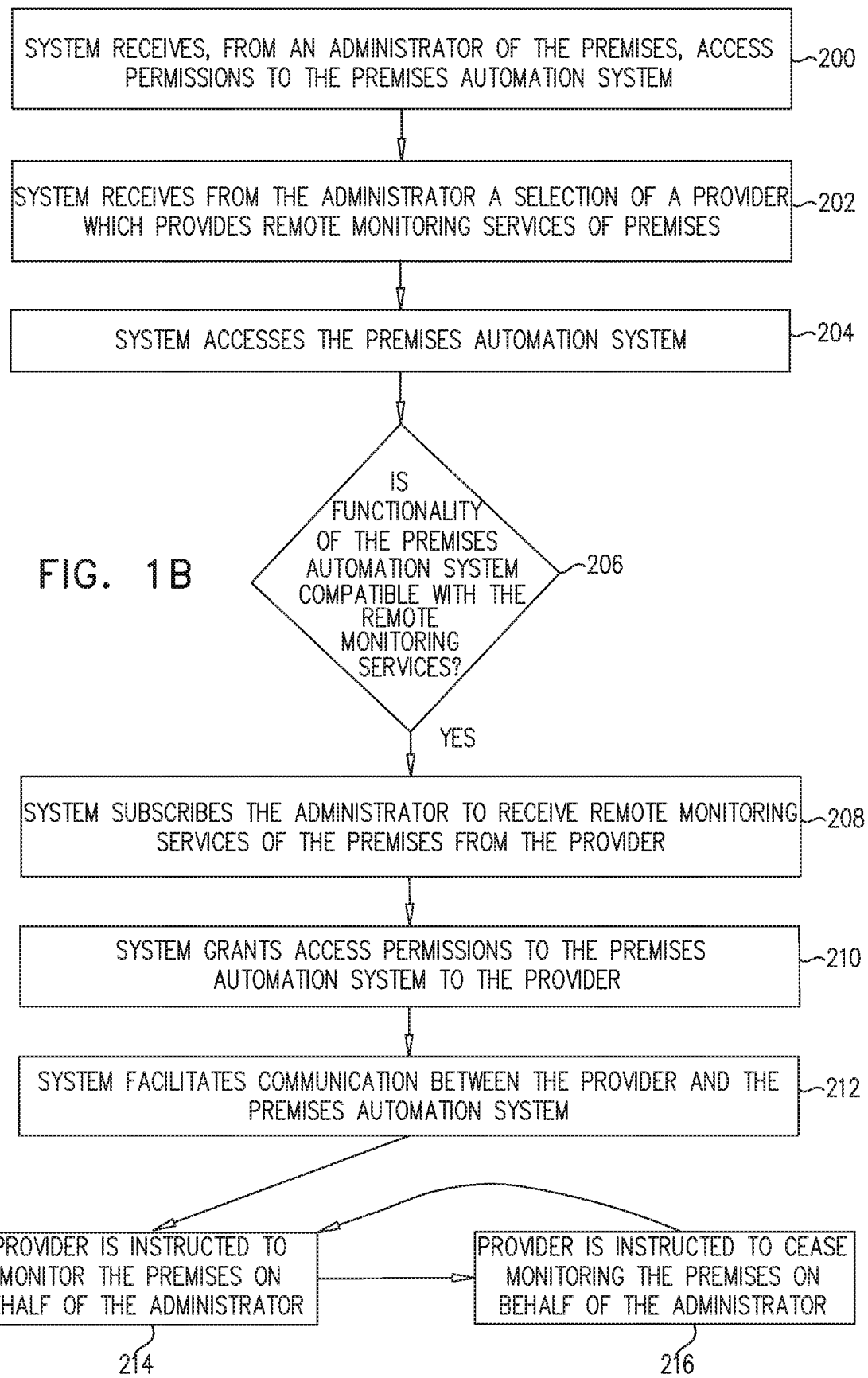

REMOTE-CONTROL SECURITY MONITORING SYSTEM AND METHOD

RELATED APPLICATIONS

This application is a § 371 National Phase Application of International Application No. PCT/IL2015/051110, filed on Nov. 18, 2015, which claims the benefit of U.S. Provisional Application No. 62/093,694, filed on Dec. 18, 2014, both of which are incorporated herein by reference in their entirety.

REFERENCE TO RELATED APPLICATIONS

Reference is made to U.S. Provisional Patent Application Ser. No. 62/093,694, filed Dec. 18, 2014 and entitled "SYSTEM AND METHOD FOR BROKERING THIRD PARTY PROFESSIONAL MONITORING SERVICES FOR PREMISES AUTOMATION SYSTEMS", the disclosure of which is hereby incorporated by reference and priority of which is hereby claimed pursuant to 37 CFR 1.78(a) (4) and (5)(i).

FIELD OF THE INVENTION

The present invention relates to remote-control monitoring systems and methods for providing remote control of a premises automation system to third party professional monitoring services.

BACKGROUND OF THE INVENTION

The present invention seeks to provide a remote-control monitoring system and method for providing remote control of a premises automation system to third party professional monitoring services, which premises automation systems typically include premises devices suitable for monitoring and managing a premises, and functionality for remotely accessing and managing the premises devices. Suitable premises devices may include, for example, motion detectors, noise detectors, smoke detectors, carbon monoxide detectors, flood detectors, cameras, lighting control devices and thermostat devices operable for controlling the temperature within the premises. Functionality for remotely accessing and managing the premises devices may include, for example, a smartphone application operable for communicating, via the Internet, with the premises devices and for receiving real-time indications of events detected by the premises devices. Such a premises automation system typically allows a user of the system, such as an owner of the premises, to employ the system to remotely monitor and manage the premises. When employed by the owner of the premises, this is typically referred to as "self-monitoring".

Commercially available premises automation systems, often referred to as "smart home" or "smart building" system include, for example, Nexia™ Home Intelligence commercially available from Nexia Intelligence LLC of Golden, Colo.

Some premises automation systems may include an API which allows for programmatically extending the system by third parties. Examples of such an API include an API provided by SmartThings, Inc. of Washington, D.C., and the "Works with Nest" Developer Program provided by Nest Labs of Palo Alto, Calif.

It is appreciated that while the premises automation system described hereinabove allows a user of the system to remotely monitor and manage the premises, the user may at times prefer that a third party professional monitoring service monitor the premises. For example, it may be desirable to have a third party monitor the premises while the user is abroad or on vacation.

It is further appreciated that communication protocols employed by typical premises automation systems may be incompatible with communication protocols employed by professional monitoring services.

Therefore, to facilitate for third party monitoring of the premises by employing a premises automation system such as that described hereinabove, it is necessary to facilitate selecting a suitable third party professional monitoring service, to provide the third party with access to the premises automation system and to facilitate communication therebetween. This may be achieved by providing a remote-control monitoring system which interfaces with premises automation system APIs, as will be described in detail hereinbelow.

SUMMARY OF THE INVENTION

The present invention seeks to provide improved remote-control monitoring systems and methods for providing remote control of a premises automation system to third party professional monitoring services.

There is thus provided in accordance with a preferred embodiment of the present invention a remote-control security monitoring system including a processor, a memory and a non-transitory, tangible computer-readable medium in which computer program instructions are stored, which instructions, when executed by the processor, cause the computer to provide remote control of a premises automation system to third party professional monitoring services, the premises automation system having premises devices operable for at least one of monitoring and managing at least part of the premises, the remote-control security monitoring system including an access permissions receiver operable for receiving, from a first entity having first access permissions to the premises automation system, second access permissions to the premises automation system, the second access permissions to the premises automation system being at least a subset of the first access permissions to the premises automation system, a premises monitoring selector operable for receiving, from the first entity, a selection of a second entity, which second entity provides remote monitoring services of premises, a premises monitoring remote-control provider operable, responsive to the selection of the second entity, for subscribing the first entity to receive remote monitoring services of the premises from the second entity, and for granting third access permissions to the premises automation system to the second entity, the third access permissions to the premises automation system being at least a subset of the second access permissions to the premises automation system, a premises monitoring activator operable, responsive to the subscribing the first entity to receive the remote monitoring services of the premises from the second entity and responsive to receiving an instruction from the first entity, for instructing the second entity to monitor the premises on behalf of the first entity, and a premises monitoring communicator operable, in accordance with the third access permissions, for facilitating communication between the second entity and the local premises automation system.

Preferably, the system also includes a premises monitoring verifier operable, responsive to the selection of the second entity, for accessing the premises automation system and for ascertaining that functionality of the premises automation system is compatible with the remote monitoring services of the second entity. Preferably, the premises monitoring remote-control provider is operable for the subscribing of the first entity to receive the remote monitoring services of the premises from the second entity, responsive to the ascertaining, by the premises monitoring verifier, that the functionality of the premises automation system is compatible with the remote monitoring services of the second entity.

Preferably, the second entity and the premises automation system are incapable of direct communication therebetween, and the facilitating communication between the second entity and the premises automation system includes at least one of forwarding communication from the second entity to the premises automation system and from the premises automation system to the second entity. Additionally, the facilitating communication between the second entity and the premises automation system preferably includes automatically modifying the premises automation system, thereby facilitating direct communication between the second entity and the premises automation system.

Preferably, the communication between the second entity and the premises automation system includes communicating instructions pertaining to the operation of the premises automation system from the second entity to the premises automation system. Additionally, the communication between the second entity and the premises automation system preferably includes forwarding data received from the premises automation system to the second entity.

Preferably, the first entity is an administrator of the premises.

Preferably, the premises automation system also includes a remote premises monitoring device communicator operable for facilitating at least one of communication, management, configuration and monitoring of at least some of the premises devices by the first the entity. Preferably, the communication between the second entity and the premises automation system includes communication between the second entity and the remote premises monitoring device communicator.

Preferably, the system is also operable for communicating with a premises analytics generator operable for generating analytics based on data received from the premises devices.

Preferably, the premises monitoring activator is operable, responsive to receiving the instruction from the first entity, for instructing the second entity to monitor the premises on behalf of the first entity for at least a predetermined amount of time designated by the first entity. Additionally or alternatively, the premises monitoring activator is operable, responsive to receiving the instruction from the first entity, for instructing the second entity to cease monitoring the premises on behalf of the first entity. Additionally or alternatively, the premises monitoring activator is operable, responsive to detecting an event, for instructing the second entity to monitor the premises on behalf of the first entity. Additionally or alternatively, the premises monitoring activator is operable, responsive to detecting an event, for instructing the second entity to cease monitoring the premises on behalf of the first entity. Preferably, the event includes exiting a predetermined geo-fence by an administrator of the premises.

Preferably, the system also includes a security recommendation provider operable for providing recommendations pertaining to implementation of security measures at the premises. Preferably, the recommendations are based at least partially on data relating to crime rates in a vicinity of the premises. Preferably, the implementation of security measures at the premises includes subscribing to a third party professional monitoring service for monitoring the premises.

Preferably, the data relating to the crime rates is automatically retrieved from at least one database maintained by at least one law enforcement agency.

There is also provided in accordance with another preferred embodiment of the present invention, a method for providing remote-control of a premises automation system to third party professional monitoring services, the premises automation system having premises devices operable for at least one of monitoring and managing at least part of the premises, the method including receiving, from a first entity having first access permissions to the premises automation system, second access permissions to the premises automation system, the second access permissions to the premises automation system being at least a subset of the first access permissions to the premises automation system, receiving, from the first entity, a selection of a second entity, which second entity provides remote monitoring services of premises, responsive to the selection of the second entity, subscribing the first entity to receive remote monitoring services of the premises from the second entity, granting third access permissions to the premises automation system to the second entity, the third access permissions to the premises automation system being at least a subset of the second access permissions to the premises automation system, responsive to the subscribing the first entity to receive the remote monitoring services of the premises from the second entity and responsive to receiving an instruction from the first entity, instructing the second entity to monitor the premises on behalf of the first entity, and in accordance with the third access permissions, facilitating communication between the second entity and the local premises automation system.

Preferably, the method also includes, responsive to the selection of the second entity, accessing the premises automation system and ascertaining that functionality of the premises automation system is compatible with the remote monitoring services of the second entity. Preferably, the subscribing of the first entity to receive the remote monitoring services of the premises from the second entity is responsive to the ascertaining that the functionality of the premises automation system is compatible with the remote monitoring services of the second entity.

Preferably, the second entity and the premises automation system are incapable of direct communication therebetween, and the facilitating communication between the second entity and the premises automation system includes at least one of forwarding communication from the second entity to the premises automation system and from the premises automation system to the second entity. Additionally, the facilitating communication between the second entity and the premises automation system includes automatically modifying the premises automation system, thereby facilitating direct communication between the second entity and the premises automation system.

Preferably, the communication between the second entity and the premises automation system includes communicating instructions pertaining to the operation of the premises automation system from the second entity to the premises automation system. Additionally, the communication between the second entity and the premises automation system includes forwarding data received from the premises automation system to the second entity.

Preferably, the first entity is an administrator of the premises.

Preferably, the method also includes facilitating at least one of communication, management, configuration and monitoring of at least some of the premises devices by the first the entity. Preferably, the communication between the second entity and the premises automation system includes communication between the second entity and the remote premises monitoring device communicator.

Preferably, the method also includes generating analytics based on data received from the premises devices.

Preferably, the method also includes, responsive to the subscribing the first entity to receive the remote monitoring services of the premises from the second entity and responsive to receiving an instruction from the first entity, instructing the second entity to monitor the premises on behalf of the first entity for at least a predetermined amount of time designated by the first entity. Additionally or alternatively, the method also includes, responsive to the subscribing the first entity to receive the remote monitoring services of the premises from the second entity and responsive to receiving an instruction from the first entity, instructing the second entity to cease monitoring the premises on behalf of the first entity. Additionally or alternatively, the method also includes, responsive to the subscribing the first entity to receive the remote monitoring services of the premises from the second entity and responsive to detecting an event, instructing the second entity to monitor the premises on behalf of the first entity. Additionally or alternatively, responsive to the subscribing the first entity to receive the remote monitoring services of the premises from the second entity and responsive to detecting an event, instructing the second entity to cease monitoring the premises on behalf of the first entity. Preferably, the event includes exiting a predetermined geo-fence by an administrator of the premises.

Preferably, the method also includes providing recommendations pertaining to implementation of security measures at the premises. Preferably, the recommendations are based at least partially on data relating to crime rates in a vicinity of the premises. Preferably, the implementation of security measures at the premises includes subscribing to a third party professional monitoring service for monitoring the premises. Preferably, the data relating to the crime rates is automatically retrieved from at least one database maintained by at least one law enforcement agency.

BRIEF DESCRIPTION OF THE DRAWINGS

The present invention will be understood and appreciated more fully from the following detailed description, taken in conjunction with the drawings in which:

FIG. 1B is a simplified flow chart illustrating steps in the operation of the system of FIG. 1A.

DETAILED DESCRIPTION OF A PREFERRED EMBODIMENT

Figure 1A:
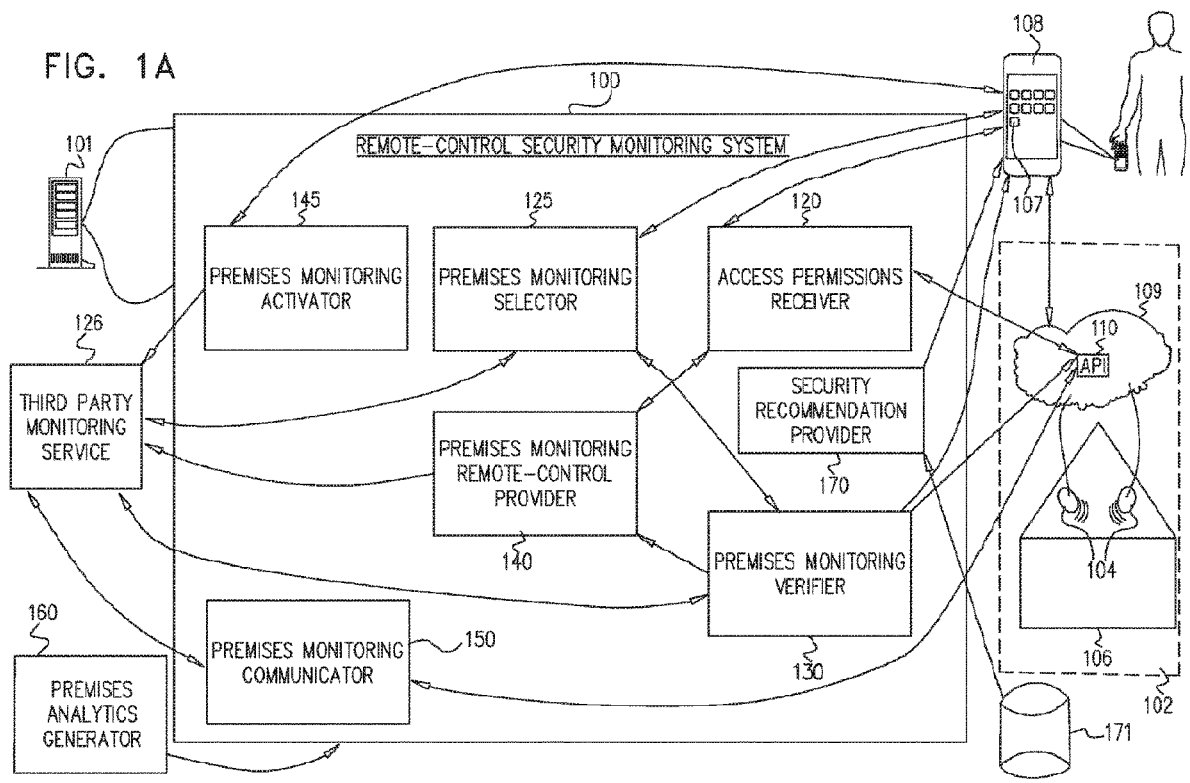
FIG. 1A is a simplified block diagram illustration of a remote-control monitoring system for providing remote control of a premises automation system to third party professional monitoring services, constructed and operative in accordance with a preferred embodiment of the present invention.

Reference is now made to FIG. 1A, which is a simplified block diagram illustration of a remote-control security monitoring system for providing remote control of a premises automation system to third party professional monitoring services, constructed and operative in accordance with a preferred embodiment of the present invention. The remote-control security monitoring system 100 of FIG. 1A is preferably embodied in a computer product which preferably resides on a computer 101. Computer 101 preferably includes a processor, a memory and a non-transitory, tangible computer-readable medium, such as a computer hard disk, in which computer program instructions are stored.

As shown in FIG. 1A, remote-control security monitoring system 100 provides remote control of a premises automation system 102 to third party professional monitoring services, premises automation system 102 preferably having premises devices 104 operable for monitoring and managing at least part of a premises 106. Premises devices 104 preferably include, for example, motion detectors, noise detectors, cameras, lighting control devices, thermostat devices, smoke detectors, carbon monoxide detectors, flood detectors and sensors capable of sensing open and closed positions of windows and doors.

Premises automation system 102 also preferably includes a remote premises monitoring device communicator 107 operable for facilitating at least one of communication, management, configuration and monitoring of premises devices 104 by an administrator, such as an owner of premises 106. It is appreciated that remote premises monitoring device communicator 107 may reside on a suitable computing device, such as a smartphone 108, and may communicate with premises monitoring devices 104, for example, via the internet. It is appreciated that providers of premises monitoring devices 104 may provide a cloud-based interface 109 suitable for providing internet-based communication therewith, thereby facilitating development of remote premises monitoring device communicator 107. It is appreciated that interface 109 may also include an API 110 for enabling third parties to develop third party applications which can interface with interface 109. One example of such an API includes the SmartThings API provided by SmartThings, Inc. of Washington, D.C., which enables $3^{rd}$ party developers to extend the functionality of devices that interact with the SmartThings Hub. Another example of such an API includes the "Works with Nest" Developer Program provided by Nest Labs of Palo Alto, Calif., which enables $3^{rd}$ party developers to extend the functionality of various Nest devices, such as the Nest Learning thermostat, the Nest camera and the Nest Protect Smoke/CO detector.

As described hereinabove, it is appreciated that while premises automation system 102 allows an administrator to remotely monitor premises 106, the administrator may at times prefer that a third party professional monitoring service monitor premises 106. For example, it may be desirable to have a third party monitor premises 106 while the administrator is abroad or on vacation. This functionality can be referred to as "Security Monitoring on Demand".

It is further appreciated that communication protocols employed by premises automation system 102 may be incompatible with communication protocols employed by the third party. Protocols typically employed by third party professional monitoring services may include, for example, IP protocols such as SIA/IP DC-09, the Surgard MLR2 commercially available from Digital Security Controls of Concord, Ontario, Canada, and variants thereof.

It is yet further appreciated that verification of suitable installation and configuration of premises automation system 102 may be required by third party professional monitoring services prior to accepting responsibility for the monitoring of premises 106 via premises automation system 102.

To facilitate the aforementioned functionality, system 100 preferably includes an access permissions receiver 120 operable for receiving via API 110, responsive to authorization received from the administrator of premises 106 via remote premises monitoring device communicator 107, at least partial access permissions to premises automation system 102. The partial access permissions to premises automation system 102 preferably include permissions to access information regarding activation of premises automation system 102, and to receive events generated by premises monitoring devices 104.

It is a particular feature of the present invention that system 100 also preferably includes a premises monitoring selector 125 operable for receiving, from the administrator of premises 106 preferably via remote premises monitoring device communicator 107, a selection of a third party monitoring service 126, which provides remote monitoring services of premises 106. It is appreciated that premises monitoring selector 125 may be operable to assist the administrator of premises 106 in selecting third party monitoring service 126 from a list of suitable third party monitoring services preferably stored by premises monitoring selector 125. For example, premises monitoring selector 125 may provide a rating for each third party monitoring service which may be based on historical customer feedback. Premises monitoring selector 125 may also recommend third party monitoring services which provide service to premises in the vicinity of premises 106. Premises monitoring selector 125 may employ social data relating to the administrator of premises 106, such as data stored on internet-based social networks for providing the aforementioned rankings and recommendations.

System 100 preferably also includes a premises monitoring verifier 130 operable, responsive to selection of third party monitoring service 126, for accessing premises automation system 102, preferably via API 110, and for ascertaining that premises automation system 102 is suitably installed and configured for remote monitoring of premises 106 by third party monitoring service 126. It is appreciated that premises monitoring verifier 130 may interact with the administrator of premises 106 via remote premises monitoring device communicator 107 and may instruct the administrator to perform various tests on premises automation system 102, while monitoring the response of premises automation system 102 to verify suitable installation and configuration thereof. These tests may be specific for third party monitoring service 126 selected by the administrator, and preferably include verifying correctness of monitoring statuses provided by premises monitoring devices 104, such as statuses corresponding to the armed or disarmed state of premises devices 104, and to open and closed positions of windows and doors monitored by premises monitoring devices 104.

It is a particular feature of the present invention that system 100 also preferably includes a premises monitoring remote-control provider 140 operable, responsive to ascertaining that premises automation system 102 is suitably installed and configured for remote monitoring of premises 106 by third party monitoring service 126, for subscribing premises automation system 102 to receive remote monitoring services of premises 106 from third party monitoring service 126 and for granting access permissions to premises automation system 102 to third party monitoring service 126 selected by the administrator of premises 106. The access permissions to premises automation system 102 granted to third party monitoring service 126 preferably include at least a subset of the access permissions received by access permissions receiver 120 from the administrator of premises automation system 102, and must be sufficient for third party monitoring service 126 to monitor premises 106 on behalf of the administrator of premises 106. It is appreciated that, alternatively, third party monitoring service 126 may employ communication functionality provided by system 100 to access premises automation system 102, in which case granting of access permissions to third party monitoring service 126 may be obviated.

It is appreciated that premises monitoring remote-control provider 140 is also preferably operable for obtaining required registration information from the administrator of premises 106, such as an address of premises 106, contact information of the administrator of premises 106, and contact information of additional individuals designated by administrator of premises 106. It is appreciated that the required registration information may differ for each particular third party monitoring service 126. Premises monitoring remote-control provider 140 may transfer the registration information to third party monitoring service 126, for example, by accessing an online database of third party monitoring service 126 or by sending an email including the registration information to third party monitoring service 126.

Premises monitoring remote-control provider 140 is also preferably operable for facilitating billing of the administrator of premises 106 for services provided by third party monitoring service 126, and for facilitating transfer of payment by administrator of premises 106 to third party monitoring service 126 for services provided thereby.

A premises monitoring activator 145 is preferably provided, responsive to subscribing premises automation system 102 to receive remote monitoring services of premises 106 from third party monitoring service 126 and responsive to receiving an instruction from the administrator of premises 106, for instructing third party monitoring service 126 to monitor premises 106 on behalf of the administrator of premises 106 for at least a predetermined amount of time. It is appreciated that the amount of time during which the administrator of premises 106 may instruct third party monitoring service 126 to monitor premises 106 may be, for example, a single duration of time, such as a duration of a vacation of the administrator, or a recurring duration of time, such as during certain days of each week. Administrator of premises 106 may alternatively instruct third party monitoring service 126 to continuously monitor premises 106 until further notice.

Additionally, the administrator of premises 106 may instruct third party monitoring service 126 to monitor premises 106 upon occurrence of a particular detectable event, such as the administrator exiting a predetermined geo-fence. Examples of such a geo-fence may include a predetermined configurable radius around premises 106 or a well defined geographical region. Such an event may be detected, for example, by remote premises monitoring device communicator 107. Similarly, the administrator of premises 106 may instruct third party monitoring service 126 to cease monitoring of premises 106 upon occurrence of a corresponding detectable event.

Preferably, administrator of premises 106 may instruct premises monitoring activator 145 to cease monitoring of premises 106 by third party monitoring service 126 at any time, or at times designated by terms dictated by premises monitoring remote-control provider 140.

It is a further particular feature of the present invention that that system 100 also includes a premises monitoring communicator 150 operable, in accordance with access permissions granted to third party monitoring service 126, for facilitating communication between third party monitoring service 126 and premises automation system 102, preferably via API 110, thereby enabling monitoring of premises 106 by third party monitoring service 126.

In a case where third party monitoring service 126 is capable of employing communication protocols compatible with those of premises automation system 102, premises monitoring communicator 150 may allow direct communication between third party monitoring service 126 and premises automation system 102.

In a case third party monitoring service 126 is incapable of employing communication protocols compatible with those of premises automation system 102, premises monitoring communicator 150 may facilitate communication between third party monitoring service 126 and premises automation system 102 by forwarding bi-directional communication between third party monitoring service 126 and premises automation system 102. This may be achieved by employing communication protocols compatible with third party monitoring service 126 to communicate therewith, and by employing communication protocols compatible with premises automation system 102 to communicate therewith.

Alternatively, premises monitoring communicator 150 may automatically employ access permissions received by access permissions receiver 120 from the administrator of premises automation system 102 to suitably modify premises automation system 102, thereby enabling premises automation system 102 to employ communication protocols compatible with communication capabilities of third party monitoring service 126, thereby facilitating direct communication between third party monitoring service 126 and premises automation system 102.

System 100 may also communicate with a premises analytics generator 160 operable for generating analytics based on data received from premises devices 104. The data may relate, for example, to events detected by the devices and to the viability of the devices over time. Premises analytics generator 160 may be, for example, a "Tyco On" Smart Services Platform, provided by Tyco International Ltd. of Princeton, N.J.

It is appreciated that to enable receiving data from premises devices 104 by premises analytics generator 160, the administrator of premises 106 must explicitly provide suitable access permissions to premises analytics generator 160, which access permissions allow collection of the data. It is further appreciated that the administrator of premises 106 is not required to provide access permissions to premises analytics generator 160 when requesting to employ system 100 for subscribing to receive service from a third party monitoring service.

System 100 preferably also includes a security recommendation provider 170 operable for providing recommendations to the administrator of premises 106, the recommendations pertaining to implementation of security measures at premises 106. The recommendations may be based, for example, on data relating to crime rates in a vicinity of premises 106, and may include, for example, a recommendation to subscribe to a third party professional monitoring service for monitoring premises 106. The data relating to the crime rates may be retrieved automatically, for example, from one or more databases 171 maintained by a law enforcement agency, the databases including information pertaining to the vicinity of premises 106.

It is appreciated that each of remote premises monitoring device communicator 107, access permissions receiver 120, premises monitoring selector 125, premises monitoring verifier 130, premises monitoring remote-control provider 140, premises monitoring activator 145, premises monitoring communicator 150, premises analytics generator 160 and security recommendation provider 170 may be, for example, a computer processor, a computer sub-processor or a computer task processor.

Reference is now made to FIG. 1B, which is a simplified flow chart illustrating steps in the operation of the system of FIG. 1A. As described hereinabove, the system of FIG. 1A provides remote control of a premises automation system to third party professional monitoring services.

As shown in FIG. 1B, the method initially includes receiving, from a first entity having first access permissions to the premises automation system, second access permissions to the premises automation system (200). The first entity may be, for example, an administrator of the premises. The second access permissions to the premises automation system are preferably at least a subset of the first access permissions to the premises automation system.

Thereafter, the method includes receiving, from the first entity, a selection of a second entity, which second entity provides remote monitoring services of premises (202). It is appreciated that the second entity and the premises automation system are incapable of direct communication therebetween.

Responsive to the selection of the second entity, the method includes accessing the premises automation system (204) and ascertaining that functionality of the premises automation system is compatible with the remote monitoring services of the second entity (206).

Responsive to the ascertaining that the functionality of the premises automation system is compatible with the remote monitoring services of the second entity, the method further includes subscribing the first entity to receive remote monitoring services of the premises from the second entity (208) and granting third access permissions to the premises automation system to the second entity (210). The third access permissions to the premises automation system are preferably at least a subset of the second access permissions to the premises automation system.

Responsive to subscribing the first entity to receive the remote monitoring services of the premises from the second entity and responsive to receiving an instruction from the first entity, the method further includes facilitating communication between the second entity and the local premises automation system (212) in accordance with the third access permissions. Thereafter, the second entity may be instructed to monitor the premises on behalf of the first entity (214) or to cease monitoring the premises on behalf of the first entity (216). The second entity may be instructed, for example, to monitor or to cease monitoring the premises on behalf of the first entity for a predetermined amount of time designated by the first entity. Alternatively, for example, the second entity may be instructed, for example, to monitor or to cease monitoring the premises on behalf of the first entity responsive to detecting an event. The event may be, for example, exiting a predetermined geo-fence by an administrator of the premises.

Facilitating communication between the second entity and the premises automation system preferably includes at least one of forwarding communication from the second entity to the premises automation system and from the premises automation system to the second entity. Facilitating communication between the second entity and the premises automation system may also include automatically modifying the premises automation system, thereby facilitating direct communication between the second entity and the premises automation system.

The communication between the second entity and the premises automation system preferably includes, for example, communicating instructions pertaining to the operation of the premises automation system from the second entity to the premises automation system and forwarding data received from the premises automation system to the second entity. The communication between the second entity and the premises automation system preferably also includes, for example, communication between the second entity and remote premises monitoring device communication functionality included in the premises automation system operable for facilitating at least one of communication, management, configuration and monitoring of at least some of the premises devices by the first the entity.

It is appreciated that the method also preferably includes providing recommendations pertaining to implementation of security measures at the premises. The recommendations may be based, for example, on data relating to crime rates in a vicinity of the premises. Data relating to the crime rates may, for example, be automatically retrieved from a database maintained by a law enforcement agency.

Implementation of security measures at the premises may include, for example, subscribing to a third party professional monitoring service for monitoring the premises.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. A method of managing a premises automation system configured to monitor a premises, comprising:
receiving, via a communication interface of the premises automation system, a first communication from one or more premises devices configured to monitor the premises;
transmitting, via the communication interface and based on a first set of access permissions associated with the one or more premises devices, the first communication to a first remote monitoring device of a first entity having the first set of access permissions;
receiving, by a computer system configured to manage the premises automation system, from the first remote monitoring device, information identifying a second remote monitoring device of a second entity selected to monitor the premises on behalf of the first remote monitoring device and a second set of access permissions associated with the one or more premises devices, wherein the second entity is different from the first entity, wherein the second set of access permissions comprise a subset of the first set of access permissions;
subscribing, by the computer system, the premises automation system to the second remote monitoring device for monitoring of the premises on behalf of the first remote monitoring device in response to the information identifying the second remote monitoring device and based on the second set of access permissions;
receiving, by the computer system via the communication interface, a second communication from the one or more premises devices, wherein the second communication occurs subsequent to subscribing the premises automation system to the second remote monitoring device for monitoring of the premises on behalf of the first remote monitoring device; and
transmitting, by the computer system and responsive to subscribing the premises automation system to the second remote monitoring device, the second communication to the second remote monitoring device.

2. The method of claim 1, wherein the information instructs the second remote monitoring device of the second entity to monitor the premises for a designated amount of time.

3. The method of claim 2, wherein the designated amount of time comprises a single duration of time or a recurring duration of time.

4. The method of claim 1, wherein the information instructs the second remote monitoring device of the second entity to monitor the premises upon occurrence of a detectable event, wherein transmitting the second communication comprises transmitting in response to the detectable event being detected by the one or more premises devices.

5. The method of claim 4, wherein the detectable event comprises exiting a geo-fence around the premises.

6. The method of claim 1, wherein the information instructs the second remote monitoring device of the second entity to cease monitoring the premises upon occurrence of a detectable event.

7. The method of claim 6, wherein the detectable event comprises entering a geo-fence around the premises.

8. The method of claim 1, further comprising:
forwarding, by the computer system, bi-directional communication between the second remote monitoring device of the second entity and the one or more premises devices by employing a first communication protocol of the second remote monitoring device in a third communication with the second remote monitoring device and a second communication protocol of the one or more premises devices in a fourth communication with the one or more premises devices, wherein the first communication protocol is different than the second communication protocol.

9. The method of claim 1, further comprising:
modifying, by the computer system, the one or more premises devices, in response to the information, to employ a communication protocol compatible with the second remote monitoring device of the second entity, the communication protocol allowing direct communication between the second remote monitoring device of the second entity and the one or more premises devices.

10. The method of claim 1, further comprising:
providing, by the computer system, a list of suitable third party monitoring services to an application on the first remote monitoring device of the first entity; and
receiving, by the computer system, from the application on the first remote monitoring device of the first entity, a selection of the second remote monitoring device of the second entity from the list of suitable third party monitoring services.

11. The method of claim 10, further comprising:
accessing the one or more premises devices by the computer system in response to the selection of the second remote monitoring device of the second entity; and
ascertaining, by the computer system, via one or more tests that functionality of the one or more premises devices is compatible with the second remote monitoring device of the second entity, wherein the one or more tests include a test to verify correctness of monitoring statuses provided the one or more premises devices, wherein the monitoring statuses correspond to one or more of an armed or disarmed state of the one or more premises devices, or an open or closed position of a window or a door.

12. A system comprising at least one processor and at least one memory storing instructions that when executed by the at least one processor cause the at least one processor to perform premises automation comprising:

receiving, via a communication interface of a premises automation system, a first communication from one or more premises devices configured to monitor a premises;

transmitting, via the communication interface and based on a first set of access permissions associated with the one or more premises devices, the first communication to a first remote monitoring device of a first entity having the first set of access permissions;

receiving, by a computer system configured to manage the premises automation system, from the first remote monitoring device, information identifying a second remote monitoring device of a second entity selected to monitor the premises on behalf of the first remote monitoring device and a second set of access permissions associated with the one or more premises devices, wherein the second entity is different from the first entity, wherein the second set of access permissions comprise a subset of the first set of access permissions;

subscribing, by the computer system, the premises automation system to the second remote monitoring device for monitoring of the premises on behalf of the first remote monitoring device in response to the information identifying the second remote monitoring device and based on the second set of access permissions;

receiving, by the computer system via the communication interface, a second communication from the one or more premises devices, wherein the second communication occurs subsequent to subscribing the premises automation system to the second remote monitoring device for monitoring of the premises on behalf of the first remote monitoring device; and transmitting, by the computer system and responsive to subscribing the premises automation system to the second remote monitoring device, the second communication to the second remote monitoring device.

13. The system of claim 12, wherein the information instructs the second remote monitoring device of the second entity to monitor the premises for a designated amount of time.

14. The system of claim 13, wherein the designated amount of time comprises a single duration of time or a recurring duration of time.

15. The system of claim 12, wherein the information instructs the second remote monitoring device of the second entity to monitor the premises upon occurrence of a detectable event, wherein transmitting the second communication comprises transmitting in response to the detectable event being detected by the one or more premises devices.

16. The system of claim 15, wherein the detectable event comprises exiting a geo-fence around the premises.

17. The system of claim 12, wherein the information instructs the second remote monitoring device of the second entity to cease monitoring the premises upon occurrence of a detectable event.

18. The system of claim 17, wherein the detectable event comprises entering a geo-fence around the premises.

19. The system of claim 12, the premises automation further comprising:

forwarding, by the computer system, bi-directional communication between the second remote monitoring device of the second entity and the one or more premises devices by employing a first communication protocol of the second remote monitoring device in a third communication with the second remote monitoring device and a second communication protocol of the one or more premises devices in a fourth communication with the one or more premises devices, wherein the first communication protocol is different than the second communication protocol.

20. One or more non-transitory computer-readable mediums storing instructions that when executed by one or more processors of a system cause the one or more processors to perform premises automation comprising:

receiving, via a communication interface of a premises automation system, a first communication from one or more premises devices configured to monitor a premises;

transmitting, via the communication interface and based on a first set of access permissions associated with the one or more premises devices, the first communication to a first remote monitoring device of a first entity having the first set of access permissions;

receiving, by a computer system configured to manage the premises automation system, from the first remote monitoring device, information identifying a second remote monitoring device of a second entity selected to monitor the premises on behalf of the first remote monitoring device and a second set of access permissions associated with the one or more premises devices, wherein the second entity is different from the first entity, wherein the second set of access permissions comprise a subset of the first set of access permissions;

subscribing, by the computer system, the premises automation system to the second remote monitoring device for monitoring of the premises on behalf of the first remote monitoring device in response to the information identifying the second remote monitoring device and based on the second set of access permissions;

receiving, by the computer system via the communication interface, a second communication from the one or more premises devices, wherein the second communication occurs subsequent to subscribing the premises automation system to the second remote monitoring device for monitoring of the premises on behalf of the first remote monitoring device; and transmitting, by the computer system and responsive to subscribing the premises automation system to the second remote monitoring device, the second communication to the second remote monitoring device.

* * * * *